United States Patent [19]

Hulme

[11] 4,172,115

[45] Oct. 23, 1979

[54] PREPARATION AND USE OF SULFUR TETRACHLORIDE DERIVATIVES OF THE FORMULA $[SA_3{}^+.MX_{n+1}{}^-]$

[75] Inventor: Roger Hulme, Somerville, N.J.

[73] Assignee: Exxon Research & Engineering Co., Florham Park, N.J.

[21] Appl. No.: 929,285

[22] Filed: Jul. 31, 1978

Related U.S. Application Data

[63] Continuation-in-part of Ser. No. 807,522, Jun. 17, 1977, abandoned, which is a continuation-in-part of Ser. No. 628,590, Nov. 4, 1975, abandoned.

[51] Int. Cl.$^2$ .................... C01B 17/45; C01B 17/00
[52] U.S. Cl. .................... 423/276; 423/292; 423/300; 423/462; 423/466; 423/468
[58] Field of Search .................. 423/467, 469, 561 R, 423/564, 511; 423/468, 292, 276, 300, 462, 466

[56] References Cited

U.S. PATENT DOCUMENTS

| | | | |
|---|---|---|---|
| 1,923,094 | 8/1933 | Jenness | 423/467 |
| 2,883,267 | 4/1959 | Muetterties | 423/469 |
| 2,992,073 | 7/1961 | Tullock | 423/469 |
| 3,000,694 | 9/1961 | Smith et al. | 423/467 |
| 3,054,661 | 9/1962 | Muetterties | 423/469 |
| 3,848,064 | 11/1974 | Becher et al. | 423/469 |

FOREIGN PATENT DOCUMENTS 805860  12/1958  United Kingdom .................. 423/469

*Primary Examiner*—O. R. Vertiz
*Assistant Examiner*—Gary P. Straub
*Attorney, Agent, or Firm*—John W. Ditsler

[57] ABSTRACT

Sulfur tetrachloride derivatives are prepared by reacting suitable sulfur-containing compounds in hydrogen fluoride with a gas containing molecular chlorine in the presence of one or more acidic halides. Such derivatives can be used to remove water from its solutions in hydrogen fluoride.

18 Claims, No Drawings

PREPARATION AND USE OF SULFUR TETRACHLORIDE DERIVATIVES OF THE FORMULA $[SA_3{}^+.MX_{n+1}{}^-]$

CROSS-REFERENCE TO RELATED APPLICATIONS

This is a continuation-in-part of application Ser. No. 807,522 filed June 17, 1977 which is a continuation-in-part of application Ser. No. 628,590 filed Nov. 4, 1975, both applications now abandoned.

BACKGROUND OF THE INVENTION

1. Field of the Invention

The present invention relates to a new method for synthesizing sulfur tetrachloride derivatives. More specifically, sulfur tetrachloride derivatives may be synthesized from suitable sulfur-containing compounds by reacting same in hydrogen fluoride with a gas containing molecular chlorine in the presence of one or more acidic halides.

2. Description of the Prior Art

Sulfur tetrachloride is an unstable material that decomposes at about $-30°$ C. Stable derivatives of $SCl_4$ may be prepared by chlorinating sulfur compounds in the presence of a Lewis acid such as aluminum chloride. In this way have been prepared $SCl_3{}^+AlCl_4{}^-$; $SCl_3{}^+SbCl_6{}^-$; and $SCl_3{}^+AsF_6{}^-$. The reaction between chlorine, sulfur-containing compounds and a Lewis acid in the presence of hydrogen fluoride has been described as a method for preparing sulfur hexafluoride (see U.S. Pat. No. 3,054,661). It is therefore surprising that I have found it possible to prepare derivatives of sulfur tetrachloride in the form of salts of complex fluoroacids in hydrogen fluoride solution. Indeed, none of the prior art teaches or suggests a method of synthesizing sulfur tetrachloride derivatives by contacting suitable sulfur-containing compounds with a gas containing molecular chlorine in the presence of one or more acidic halides and hydrogen fluoride.

SUMMARY OF THE INVENTION

Now, in accordance with the present invention, a method has been found for synthesizing sulfur tetrachloride derivatives by contacting suitable sulfur-supplying reagents with hydrogen fluoride and with a gas containing molecular chlorine at a temperature above about $-50°$ C., said contacting being done in the presence of one or more acidic halides of the formula $MX_n$ where M is an element selected from the group consisting of tantalum, niobium, titanium, zirconium, hafnium, phosphorus, arsenic, antimony, boron or mixtures thereof, X is a halogen, n is the atomic ratio of halogen to M and varies from 3-5. The acidic halides may also be generated in situ from the metal or non-metallic parent. Suitable sulfur-containing compounds include elemental sulfur, the sulfanes, the lower sulfur halides (e.g. $S_2Cl_2$, $SCl_2$) and metal sulfides. When the reactants are contacted accordingly, there results a gas phase comprising predominantly hydrogen chloride and a liquid phase from which sulfur tetrachloride derivatives can be recovered. Preferably, the contacting will occur under substantially anhydrous conditions.

In another embodiment of the present invention, it has been found that whereas the sulfur tetrachloride derivatives are surprisingly stable towards solvolysis by anhydrous hydrogen fluoride or solutions of the aforementioned acidic halides in anhydrous hydrogen fluoride, said sulfur tetrachloride derivatives react with water in either system to produce gaseous thionyl fluoride ($SOF_2$) and HCl. Thus, use of compounds prepared according to the present invention enables the removal of water from a solution containing water and hydrogen fluoride, including solutions comprising water, hydrogen fluoride and the aforementioned acidic halides.

In an analogous manner, the addition of water and of a gas containing molecular chlorine to a mixture comprising suitable sulfur-containing compounds and hydrogen fluoride can be used to remove the sulfur in said sulfur-containing compounds from said mixture as gaseous $SOF_2$. Also the addition of chlorine to a mixture comprising water and suitable sulfur-containing compounds, whether or not in the presence of the above-mentioned acidic halides, serves to reduce the concentration of the water and of the sulfur compounds simultaneously.

DETAILED DESCRIPTION OF THE INVENTION

The acidic halides used in the present invention are of the formula $MX_n$ where M is an element selected from the group consisting of tantalum, niobium, titanium, zirconium, hafnium, phosphorus, arsenic, antimony, boron or mixtures thereof, X is a halogen, n is the atomic ratio of halogen to M and varies from 3-5 (see Olah, G. A. *Friedel-Crafts Chemistry*, John Wiley & Sons, pp. 215-216, New York, 1973). Preferred acidic halides are tantalum halides, niobium halides or mixtures thereof. For the purposes of this invention, X will be considered to be a single halogen (i.e., fluorine, chlorine, bromine and iodine) even though it should be understood that X could refer to a mixed halogen such that $MX_n$ could be, for example, $TaF_4Cl$. Specific examples of useful acidic fluorides include antimony pentafluoride, tantalum pentafluoride, niobium pentafluoride, titanium tetrafluoride, boron trifluoride, arsenic pentafluoride, mixtures thereof and the like. Tantalum pentafluoride, niobium pentafluoride or mixtures thereof are preferred acidic fluorides. Such acidic halides can be used as such or formed in situ from the element by reaction with the chlorine and hydrogen fluoride.

The sulfur can be employed either in elemental or in combined form. Thus, the reaction mixture can comprise, in addition to hydrogen fluoride, and one or more acidic halides, sulfur and chlorine as the separate elements: or sulfur dichloride ($SCl_2$), or a sulfane or sulfanes (compounds of the formula $H_2S_y$ where y ranges from 1-6 such as are described in Cotton, F. A. and Wilkinson, G. *Advanced Inorganic Chemistry—A Comprehensive Study*, 3rd Ed. N.Y. Interscience Publishers, New York, 1972), or disulfurdichloride ($S_2Cl_2$) or sulfur bromide, or mixtures thereof, each with additional chlorine. The chlorine content of the gas is not critical and may range between 1 and 100 mole %, but is preferably between 10 and 100 mole % and most preferably between 50 and 100 mole %.

While not wishing to be bound by any particular theory, it is believed that the above-identified sulfur compounds react with chlorine to form unstable sulfur tetrachloride ($SCl_4$) which then reacts with one or more acidic halides to form compounds containing the cation $SCl_3{}^+$ or derivatives thereof, having the general form $[SA_3{}^+.MX_{n+1}{}^-]$ where A is fluorine, chlorine or mixtures thereof and X may be partially or totally replaced by fluorine. At temperatures of $100°$ C. or less and for reaction times of less than ten and preferably less than five minutes, the $SCl_3^+$ cation will be formed preferentially. Typically, as deduced from the chloride analysis, the purity of the $SCl_3^+$ salts formed in this way exceeds 90%. However, at temperatures greater than 100° C. and longer reaction times, the chlorine may be increasingly replaced by fluorine to form cations of the type $SFCl_2^+$ and $SF_2Cl^+$ and eventually be totally replaced by fluorine to form the $SF_3^+$ cation. Thus the term derivatives of sulfur tetrachloride as used herein is meant to include the cations $SCl_3^+$, $SCl_2F^+$, $SF_2Cl^+$ and $SF_3^+$.

Although the mechanism of the reaction is not known with certainty, it appears that the stoichiometry of the process using the above-mentioned sets of reactants can be represented by the following equations, wherein $ES_v$ denotes a metal sulfide with v ranging from 0.5 to 3, the acidic halide is an acidic fluoride ($MF_n$) or is generated in situ from the element M, and the sulfane is $H_2S$.

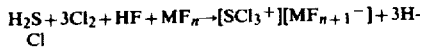  (1)

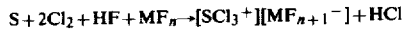  (2)

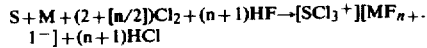  (3)

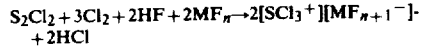  (4)

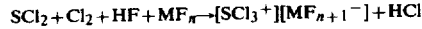  (5)

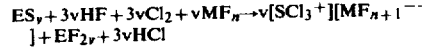  (6)

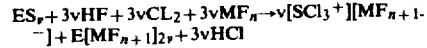  (7)

In all of the above reactions, the principal reaction products are sulfur tetrachloride derivatives and hydrogen chloride. As shown by reaction 6, it is also possible to use chlorine and a metal sulfide, $ES_v$, which form sulfur and/or a sulfur chloride. Such sulfur-supplying reactants include the sulfides of any metal or metalloid of the Periodic Table of the Elements. Suitable sulfides are, for example, those of sodium, potassium, calcium, barium, iron, cobalt, nickel, copper, zinc, cadmium, mercury, phosphorus, arsenic and the like. In reaction (6), the metal fluoride $EF_{2v}$ is also formed. In those cases where this compound is basic and will displace the $SCl_3^+$ cation from its salts (for example, where E forms basic mono-, di-, or trivalent cations such as $Na^+$, $Ca^{++}$, or $Fe^{+++}$), it is necessary to add further acidic halide to complex said fluoride as is shown in reaction (7).

By using a sulfide of those elements commonly referred to as metalloids (e.g. boron, phosphorus, arsenic, antimony and bismuth), it is again possible to generate the acidic halide in situ such as is shown in the reaction below:

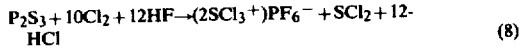  (8)

It is by no means essential to use the reactants in precisely the stoichiometric proportions shown in the above equations. Although the above reactions will proceed with small amounts of hydrogen fluoride, it is preferred to employ at least stoichiometric proportions relative to sulfur in order to provide a reaction solvent. However, in the interest of efficient utilization of the sulfur, it is recommended to have the chlorine and the sulfur present in the system (separately or combined) in such amounts that the atom ratio of chlorine to sulfur is at least 1:1, preferably at least 3:1 and still more preferably at least 4:1. At least 0.5, preferably 1.0 mole, of acidic halide should be present per mole of sulfur. If the acidic halide is generated in situ from the element, then chlorine is required in an amount sufficient to raise the element to the appropriate oxidation state, i.e., the oxidation state whose halides correspond to those described above.

It is preferred but by no means critical that the reaction be conducted under substantially anhydrous conditions; i.e., less than 1 wt. % water, to prevent or minimize the formation of such compounds as thionyl fluoride due to the hydrolysis of sulfur tetrachloride derivatives in HF. Thus, the reactants should also be substantially anhydrous. In general, organic compounds should be substantially absent from the reaction zone to minimize chlorine-consuming reactions.

The temperature of the reaction zone may range broadly but should be maintained between about −50° and about 200° C. However, at temperatures greater than 100° C. and reaction times greater than 10 minutes using any set of reactants, compounds of the formula $[SF_3^+ \cdot MX_{n+1}^-]$ will be formed as an increasingly greater percentage of the product. In addition, higher temperatures could lead to increased corrosion of the materials of construction. Preferably, the temperature of the reaction zone should be maintained below about +150° C., e.g., −50° to about +150° C., more preferably between from about −50° to about +100° C., and most preferably between 0° C. and 100° C.

The pressure at which the reaction is effected is not critical to the present invention, and in general, will be the autogenous pressure developed by the reactants at the reaction temperature. Typically, the total pressure will range from about 0.1 to about 100 atmospheres. Depending upon the temperatures, reaction times can range broadly. For example, reaction times of from about 1 second to several hours can be used. Preferably, the reaction time will range from about 1 second to 5 hours, more preferably from about 1 second to about 1 hour, and most preferably from about 1 second to about 10 minutes.

The reaction to synthesize sulfur tetrachloride derivatives occurs substantially in the liquid hydrogen fluoride phase and may be carried out in any suitable apparatus. Contacting may be effected in batch, semi-continuous, or continuous operation. The contacting zone may comprise one or more reaction zones arranged in series, or in parallel flow or both, with or without mechanical agitation. Equipment most suitable for a specific application is beyond the scope of the present invention and can be selected by one skilled in the art. Suitable materials of construction for contacting vessels include Hastelloy C, Monel and other hydrogen fluoride-resistant materials such as Teflon, Kel-F, and the like.

In a preferred embodiment of the present invention, a sulfur-containing compound such as sulfur dichloride and molecular chlorine are introduced into a reaction zone containing substantially liquid hydrogen fluoride and a suitable acidic halide or elemental precursor and reacted under conditions described above for a period of time sufficient to form a product mixture comprising a liquid phase containing sulfur tetrachloride derivatives dissolved in hydrogen fluoride and a gas phase containing predominantly hydrogen chloride. The gas phase may also contain volatiles resulting from the presence of water. The sulfur tetrachloride derivatives may then be recovered from the liquid phase, generally in a substantially pure state, by evaporation of the solvent.

As a specific example, if the acidic halide is tantalum pentafluoride ($TaF_5$), the product mixture will comprise a liquid phase containing the [$SCl_3^+ \cdot TaF_6^-$] complex dissolved in hydrogen fluoride and a gas phase containing hydrogen chloride and hydrogen fluoride. Excess reactants will be found in either or both phases. The system is then evacuated to remove both the hydrogen chloride and hydrogen fluoride from the product mixture. Should the sulfur-containing reactant above be the metal sulfide $ES_v$, the compound $EF_{2v}$ or $E(MF_{n+1})_{2v}$ will also be present in the product mixture. Results similar to that described for tantalum pentafluoride will be obtained using other acidic halides. Detailed phase behavior will depend upon the volatility of the particular acidic halide employed.

Sulfur tetrachloride derivatives have use as halogenating agents (see Journal of Physical Chemistry, 74, P. 3385, 1970, the disclosures of which are incorporated herein by reference). In addition, the present invention discloses that sulfur tetrachloride derivatives may be used for removing water from strong acid systems, particularly systems comprising combinations of acidic halides and hydrogen fluoride. This may be represented, for example, by the following equation:

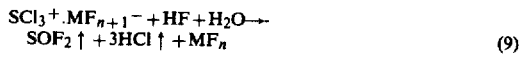

$$SCl_3^+ \cdot MF_{n+1}^- + HF + H_2O \rightarrow SOF_2\uparrow + 3HCl\uparrow + MF_n \qquad (9)$$

The sulfur tetrachloride derivatives can be introduced as such or generated in situ as described above.

From equation (9) above, it may be seen that the formation of sulfur tetrachloride derivatives from a mixture of suitable sulfur-containing compounds with hydrogen fluoride, said hydrogen fluoride containing water, results in the removal of the sulfur in said compounds from said mixture as gaseous thionyl fluoride.

The amount of sulfur removed will vary with the amount of water present and is limited by the stoichiometry of equation (9). For example, one mole of water can remove no more than one mole of sulfur as thionyl fluoride. Similarly, not more than one mole of water can be removed by one mole of sulfur.

The following examples are presented to illustrate further the process of the present invention and are not intended to restrict unduly the limits of the claims appended hereto. In all of the examples, millimoles is abbreviated mmoles.

EXAMPLE 1

Into a 128 ml Hastelloy C reactor containing a Teflon coated magnetic stirrer was placed elemental sulfur (8.0 g, 250 mmoles) and tantalum pentafluoride (70.0 g, 254 mmoles). After evacuation, 19.8 g. HF and 43.7 g. $Cl_2$ (610 mmoles) were condensed at about $-78°$ C. The vessel was allowed to warm spontaneously, which it did rapidly, the total pressure rising to about 300 psi at 25° C. Infrared analysis of this gas showed it to be HCl with traces of $SOF_2$. The vessel was then cooled to about $-78°$ C. at which time more $Cl_2$ was added. The vessel was then warmed to room temperature for about an hour. It was then cooled to about 0° C. and the volatiles were removed in vacuo. 107 gms of a colorless solid were recovered from the vessel. When analyzed it was found to contain 23.7 wt. % Cl and 8.17 wt. % S. Theoretically, if all the original sulfur had been converted to $SCl_3^+ TaF_6^-$, 108 g. of material containing 24.5 wt.% Cl and 7.4 wt. % S would have been recovered.

This example shows that sulfur tetrachloride derivatives can be prepared from elemental sulfur and tantalum pentafluoride.

EXAMPLE 2

Into a Kel-F tube was placed tantalum pentafluoride (5.46 g: 19.8 mmoles). After evacuation, anhydrous hydrogen fluoride was distilled in (7.67 g: 384 mmoles) followed by hydrogen sulfide (0.3 g: 8.7 mmoles). Small amounts of chlorine were added at about atmospheric pressure and the HCl produced was removed under reduced pressure. This procedure was repeated several times. The first additions of chlorine produced elemental sulfur. Subsequent chlorine additions resulted in the formation of intensely colored solids presumably containing polyatomic cations of sulfur. Additional chlorine was added until the system became colorless and homogeneous. Volatiles were then removed under reduced pressure at room temperature leaving a colorless crystalline solid weighing 6.92 g. Theoretically, had all of the $H_2S$ been converted to $SCl_3^+$, the product would have had the composition ([$SCl_3^+$][$TaF_6^-$].1.27 $TaF_5$) and be expected to weigh 6.84 g.

This example illustrates the preparation of sulfur tetrachloride derivatives from $H_2S$ and tantalum pentafluoride.

EXAMPLE 3

Into the Hastelloy C reactor employed in Example 1 was placed powdered tantalum metal (1.90 g: 10.51 mmole) and powdered sulfur (0.35 g: 10.9 mmole). After evacuation, anhydrous hydrogen fluoride (8.7 g: 435 mmole) was distilled in, followed by an undetermined amount of chlorine, both of these additions being made with the reactor cooled in liquid nitrogen. The vessel was allowed to warm spontaneously to room temperature by which time it had developed a total pressure of 150 psig—well above that of liquid chlorine. The gas was vented from the system until the pressure was about atmospheric. The vessel was cooled again using liquid nitrogen and more $Cl_2$ was added. The vessel was then heated to 70° C. for about one hour while stirring the contents magnetically. The vessel was then cooled to 25° C. and found to contain excess free chlorine. Volatiles were evacuated from the vessel and a colorless crystalline material was recovered therefrom in a dry nitrogen atmosphere. The solid was analyzed argentimetrically and was found to contain 19.5 wt.% chloride; i.e., less than the amount of chloride obtained in Example 1 where the temperature was kept at 25° C. to avoid solvolysis.

This example shows that sulfur tetrachloride derivatives can be formed from sulfur and an acidic halide generated in situ.

EXAMPLE 4

Into the Hastelloy C reactor employed in Example 1 was placed sulfur (0.353 g:11 mmoles). The vessel was evacuated and cooled to about $=78°$ C. Hydrogen fluoride 7.0 g: 350 mmoles), chlorine (3.9 g: 55 mmoles) and phosphorus pentafluoride (4.0 g: 32 mmoles) were then distilled into the vessel. On warming to 25° C., the total pressure rose to about 170 psi. The reactor was cooled to 0° C. and then vented to atmospheric pressure. An infrared spectrum of this gas showed it to contain both HF and HCl. The vessel was then cooled to −78° C. and evacuated until it ceased to lose weight.

From the reactor was recovered 2.45 g. of clear colorless crystals which were analyzed in triplicate for chloride, yielding values of 37.7 wt.%, 38.5 wt.% and 38.1 wt.%. An infrared spectrum of this solid between silver chloride plates showed absorption at 740 cm$^{-1}$, ascribed to $PF_6^-$, and at 450 cm$^{-1}$ and 565 cm$^{-1}$ ascribed to $SCl_3^+$. Theoretically, had all of the sulfur been converted to $SCl_3^+PF_6^-$, the residue would contain 37.6 wt.% chlorine and weigh 2.58 g.

This example shows that sulfur tetrachloride derivatives can be prepared from elemental sulfur and phosphorus pentafluoride.

EXAMPLE 5

Into the Hastelloy C reactor employed in Example 1 was placed disulfurdichloride (5.2 g: 38.5 mmole). The vessel was cooled to −78° C. and evacuated. Anhydrous hydrogen fluoride (25.6 g: 1280 mmoles), chlorine (7.2 g: 101 mmoles) and boron trifluoride (21 g: 310 mmoles) were then distilled into the vessel. On warming to 25° C., the total pressure rose spontaneously to 470 psi. The gases were vented to atmospheric pressure and the vessel then evacuated to constant weight. From the vessel was recovered 15.2 g of a colorless crystalline solid which was analyzed in duplicate for chloride, yielding results of 48.0 wt.% and 47.2 wt.%. Theoretically, had all of the disulfurdichloride been converted to $SCl_3^+BF_4^-$, the product would be expected to weigh 17.3 g and contain 47.3 wt.% chlorine.

This example illustrates the preparation of sulfur tetrachloride derivatives from disulfurdichloride and boron trifluoride.

EXAMPLE 6

Into the Hastelloy C reactor employed in Example 1 was placed $SCl_3^+BF_4^-$ (2.26 g: 10 mmoles). The vessel was then cooled to −78° C. and evacuated. Hydrogen fluoride (3.0 g: 150 mmoles) was then distilled in and the vessel then heated to 70° C. for 60 hours. After cooling to 25° C., the gases were vented into water and the resulting solution was analyzed for chloride ion. The result showed that only 14 wt.% of the chlorine had been displaced from the complex.

This example shows how slowly HCl is liberated from $SCl_3^+BF_4^-$ in HF at 70° C.

EXAMPLE 7

An experiment similar to that in Example 6 was conducted using $SCl_3^+BF_4^-$ (0.588 g: 2.6 mmoles) and hydrogen fluoride (2.5 g: 125 mmoles). After heating to 120° C. for 3 hours, only 36 wt.% of the chloride had been displaced from the complex.

This sample shows that at 120° C., HCl is incompletely displaced from $SCl_3^+BF_4^-$ in HF.

EXAMPLE 8

An experiment similar to that in Example 6 was conducted using $SCl_3^+TaF_6^-$ (5.53 g: 12.75 mmoles) and hydrogen fluoride (5.9 g: 295 mmoles). After heating at 110° C. for one hour and then at 150° C. for two hours, it was found that only 29.7 wt.% of the chlorine had been displaced from the complex as hydrogen chloride.

This example also shows that even at 150° C., HCl is incompletely displaced from $SCl_3^+TaF_6^-$ in HF.

Thus, Examples 6–8 show that the salts of $SCl_3^+$ are solvolyzed only slowly to mixed fluoro-chloro salts by anhydrous hydrogen fluoride.

Thus, Examples 6–8 show that sulfur tetrachloride derivatives are solvolyzed only slowly by anhydrous hydrogen fluoride.

EXAMPLE 9

Into the Hastelloy C reactor employed in Example 1 was placed $SCl_3^+TaF_6^-$ (3.40 g: 7.83 mmoles). The vessel was evacuated and cooled in liquid nitrogen. Hydrogen fluoride (8.7 g: 435 mmoles) and water (0.50 g: 28 mmoles) were then distilled into the vessel. The vessel was then warmed to 40° C. and the total pressure rose to 70 psi within five minutes. The gases were vented into water and the solution analyzed for chloride ion, yielding a value of 21.4 mmoles of chloride. Had the reaction between the water and $SCl_3^+TaF_6^-$ proceeded according to equation (7), a total of 23.5 mmoles of HCl would have been liberated.

This example, by comparison with Examples 6–8, shows that sulfur tetrachloride derivatives, which are, relatively inert towards anhydrous HF, react rapidly with water dissolved in HF solution. In conjunction with Examples 1–5 above, this example also shows that the sulfur in suitable sulfur-containing compounds can be removed from their mixtures with hydrogen fluoride by addition of water and a gas containing molecular chlorine.

EXAMPLE 10

Into the Hastelloy C reactor employed in Example 1 was placed $SCl_3^+TaF_6^-$ (4.39 g: 10.1 mmoles) and tantalum pentafluoride (7.4 g: 26.8 mmoles). The vessel was cooled to −78° C. and anhydrous hydrogen fluoride (14.8 g: 740 mmoles) was distilled in. The vessel was then heated to 50° C. for 20 minutes, then cooled in ice and the gas phase was vented into water. The resulting solution was analyzed for chloride ion and found to contain 0.08 mmoles of chloride ion.

The vessel was then cooled in liquid nitrogen and water added (0.2 g: 11.1 mmoles). After heating to 40° C. for 30 minutes and then cooling to 0° C., the gases in the reactor were vented into water and the resulting solution analyzed and found to contain 0.48 millimoles of chloride ion, or six times as much as found in the absence of water.

This example shows that sulfur tetrachloride derivatives react with water even in extremely strong acid solutions such as HF-TaF$_5$.

What is claimed is:

1. A process for the preparation of derivatives of sulfur tetrachloride having the formula $[SA_3^+.MX_{n+1}^-]$ where A is fluorine, chlorine or mixtures thereof, where M, X and n are defined below and S is sulfur, which comprises
   (1) contacting in a reaction zone, at a temperature in the range of from about −50° to about +200° C., substantially liquid hydrogen fluoride with at least one member selected from the group consisting of the sulfanes, elemental sulfur, disulfurdichloride, sulfur dichloride, sulfur bromide, metal sulfides and mixtures thereof, and with a gas containing molecular chlorine, and with one or more acidic halides of the formula $MX_n$ where M is an element selected from the group consisting of tantalum, niobium, titanium, zirconium, hafnium, phosphorus, arsenic, antimony, boron and mixtures thereof, X is a halogen, n is the atomic ratio of halogen to M and varies from 3-5, thereby forming said sulfur tetrachloride derivatives dissolved in hydrogen fluoride, and (2) recovering at least a portion of the sulfur tetrachloride derivatives formed in (1).

2. The process of claim 1 wherein said process is conducted at a temperature between about −50° and +100° C.

3. The process of claim 2 wherein A is chlorine.

4. The process of claim 1 wherein the acidic halide is tantalum pentafluoride, niobium pentafluoride or mixtures thereof.

5. The process of claim 1 wherein the sulfur-containing compound is $H_2S$.

6. The process of claim 1 wherein A is chlorine or a mixture of fluorine and chlorine.

7. A method for reducing the water content of an acid solution comprising (1) one or more acidic halides of the formula $MX_n$ where M is an element selected from the group consisting of tantalum, niobium, titanium, zirconium, hafnium, phosphorus, arsenic, antimony, boron and mixtures thereof, X is a halogen, n is the atomic ratio of halogen to M and varies from 3-5 and (2) liquid hydrogen fluoride, by contacting at a temperature in the range of from about −50° to about 200° C., said acid solution with derivatives of sulfur tetrachloride having the formula $[SA_3^+.MX_{n+1}^-]$ where S is sulfur and A is fluorine, chlorine or mixtures thereof.

8. The process of claim 7 wherein the temperature ranges between −50° and 100° C.

9. The process of claim 7 wherein A is chlorine.

10. The process of claim 7 wherein the acidic halide is tantalum pentafluoride, niobium pentafluoride, or mixtures thereof.

11. The process of claim 7 wherein A is chlorine or a mixture of fluorine and chlorine.

12. The process of claim 7 wherein said sulfur tetrachloride derivative is prepared by contacting (1) substantially liquid hydrogen fluoride, (2) at least one member selected from the group consisting of the sulfanes, elemental sulfur, disulfurdichloride, sulfur dichloride, sulfur bromide, metal sulfides and mixtures thereof, (3) a gas containing molecular chlorine and (4) one or more of said acidic halides of the formula $MX_n$, said contacting being effected at a temperature in the range of from about −50° to about 200° C.

13. The process of claim 12 wherein said sulfur-containing compound is $H_2S$.

14. The process of claim 12 wherein said acidic halide is tantalum pentafluoride, niobium pentafluoride or mixtures thereof.

15. A method for reducing the sulfur content of a mixture comprising (1) a sulfur-containing compound selected from the group consisting of sulfanes, elemental sulfur, disulfurdichloride sulfur dichloride, sulfur bromide, metal sulfides and mixtures thereof, (2) one or more acidic halides of the formula $MX_n$ where M is an element selected from the group consisting of tantalum, niobium, titanium, zirconium, hafnium, phosphorus, arsenic, antimony, boron and mixtures thereof, X is a halogen, n is the atomic ratio of halogen to M and varies from 3-5 and (3) substantially liquid hydrogen fluoride, by contacting, at a temperature in the range of from about −50° to about 200° C., said mixture with water and a gas containing molecular chlorine.

16. The process of claim 15 wherein the temperature ranges between −50° and 100° C.

17. The process of claim 15 wherein the acidic halide is tantalum pentafluoride, niobium pentafluoride, or mixtures thereof.

18. The process of claim 15 wherein said sulfur-containing compound is $H_2S$.

* * * * *